United States Patent [19]

Mooney

[11] Patent Number: 4,709,897
[45] Date of Patent: Dec. 1, 1987

[54] SURVEILLANCE CAMERA MOUNT
[75] Inventor: Paul C. Mooney, Northbrook, Ill.
[73] Assignee: Quick-Set, Incorporated, Northbrook, Ill.
[21] Appl. No.: 890,469
[22] Filed: Jul. 30, 1986
[51] Int. Cl.[4] .......................................... F16M 13/00
[52] U.S. Cl. .................................... 248/551; 70/163; 70/441; 70/DIG. 49; 248/300; 248/553; 358/108
[58] Field of Search ............ 248/551, 552, 553, 205.1, 248/300; 70/DIG. 49, 441, 163, 164, 160, 167, 166, 170, 171; 354/293, 294; 358/229, 108; 352/243

[56] References Cited

U.S. PATENT DOCUMENTS

| 3,530,268 | 9/1970 | Aubrey | 358/108 X |
|---|---|---|---|
| 3,613,538 | 10/1971 | Horberg, Jr. | 352/243 |
| 3,734,335 | 5/1973 | Lincoln | 70/160 X |
| 3,819,856 | 6/1974 | Pearl et al. | 354/81 X |
| 4,125,051 | 11/1978 | Herkes et al. | 411/911 |
| 4,160,999 | 7/1979 | Claggett | 352/243 X |
| 4,502,306 | 3/1985 | Scammacca | 70/DIG. 49 X |
| 4,584,856 | 4/1986 | Petersdorff et al. | 70/167 X |
| 4,613,109 | 9/1986 | Boscacci | 248/553 |

Primary Examiner—J. Franklin Foss
Assistant Examiner—David L. Talbott
Attorney, Agent, or Firm—Wood, Dalton, Phillips, Mason & Rowe

[57] ABSTRACT

A surveillance camera mount including a bracket and a base defining a hollow housing which are formed so as to render the mount essentially tamper-proof. The bracket is adapted to be secured to a mounting surface and includes a surface adapted to support a surveillance camera and an opening or channel disposed to face opposite the camera supporting surface. The base conforms to the opening or channel in the bracket and has a flange extending substantially about the perimeter thereof with at least a portion adapted to be disposed internally of the bracket. When the base is secured to the bracket, the fasteners adapted to mount the bracket to the mounting surface and the camera to the camera supporting surface are concealed.

21 Claims, 8 Drawing Figures

FIG.1

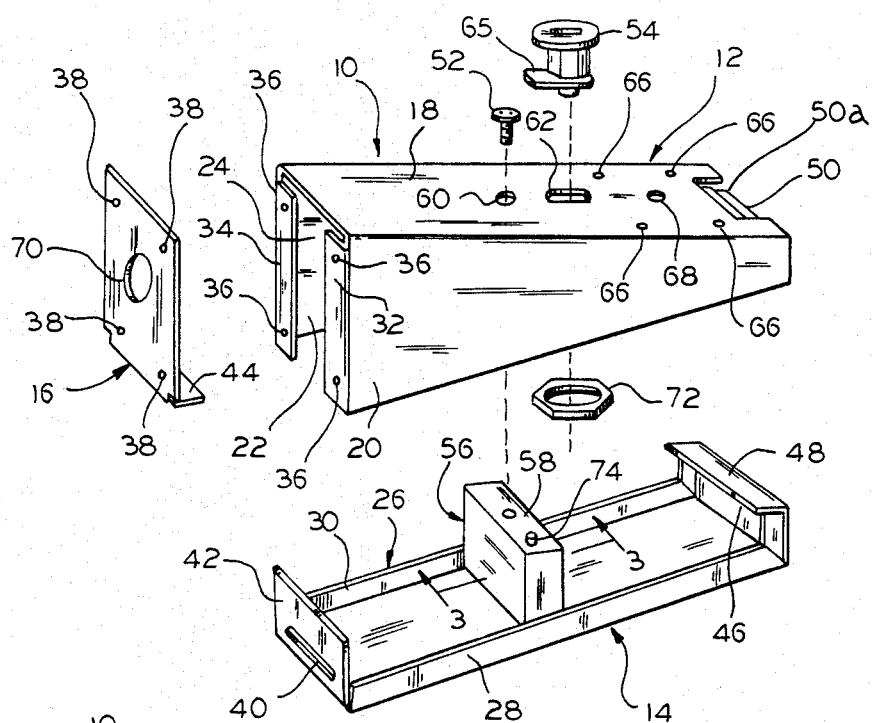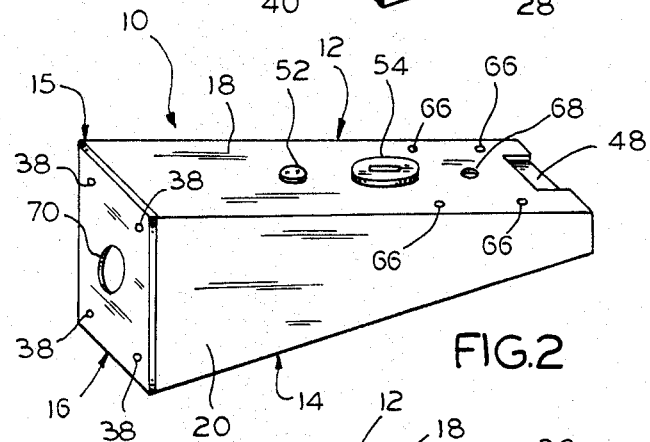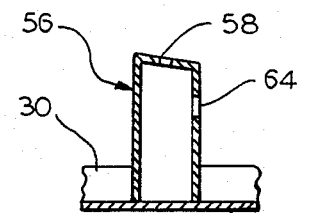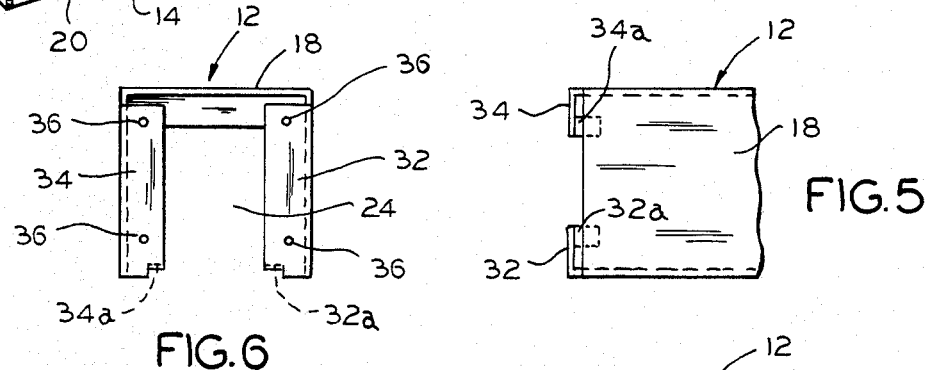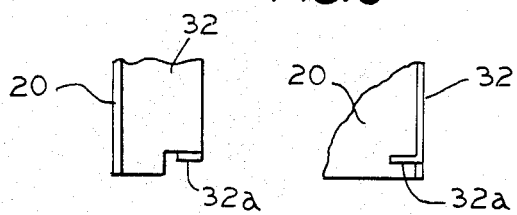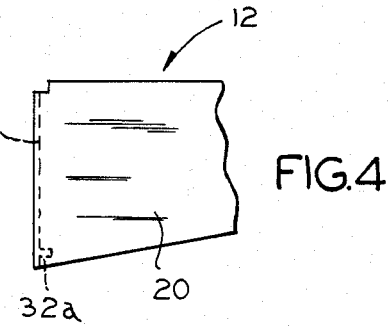

SURVEILLANCE CAMERA MOUNT

FIELD OF THE INVENTION

The present invention relates to a camera mounting device and, more particularly, to television camera mounts for secure remote surveillance of a particular area.

BACKGROUND OF THE INVENTION

In recent years, there has been a growing need for secure remote surveillance by utilizing television cameras. This is true, of course, of many diverse areas that require a high degree of security, with two of the more common being banks and retail stores. In such places, the television camera may pan and/or tilt or be stationary mounted.

In many installations, the television camera may be constantly aimed at a particular reference point which is to be constantly monitored. Such installations requiring fixed monitoring include bank vault doors, emergency exits, or particularly important locations within a security area. In many other installations, the television camera may be mounted for movement to reduce the number of cameras needed for effective surveillance.

In any event, there has been a growing problem that directly involves the surveillance camera mount. Specifically, the television cameras used for surveillance have been the subject of theft in increasing numbers due to the fact that the mount is not tamper-proof and/or is easily destroyed or removed from a wall or the like. Accordingly, is has remained to provide a surveillance camera mount that is capable of overcoming the above stated problem.

SUMMARY OF THE INVENTION

To overcome the problem of theft of television cameras, the present invention is directed to a surveillance camera mount having a bracket and a base defining a hollow housing. The bracket, which is adapted to be secured to a mounting surface, has a surface adapted to support a surveillance camera together with an opening disposed to face opposite the camera supporting surface. The base, which conforms to the opening in the bracket, has a flange extending substantially about the perimeter thereof with at least a portion adapted to be disposed internally of the bracket. With this arrangement, means are also provided for mounting the bracket to the mounting surface and for securing the base to the bracket in a tamper-proof manner.

The camera mount has a structure which encloses the mounting of the camera to the bracket as well as the mounting of the bracket to a wall so that a thief has no exposed features to approach in trying to steal the camera itself or the camera and the bracket as a unit.

More specifically, the bracket mounting means is concealed by the base when the base is secured to the bracket by the base securing means. This is accomplished, in part, due to the construction of the bracket and base which comprise the hollow housing in that the bracket includes a pair of spaced, elongated side walls together with retaining means associated with the camera support surface at a location remote from the mounting surface and the flange on the base includes a pair of spaced, elongated side flange portions, both of which are disposed internally of the hollow housing defined by the base and bracket when the base is secured to the bracket. In addition, a front flange portion of the base defines a front wall having a lip adapted to be disposed in operative relation with the retaining means of the bracket.

In a preferred embodiment, the surveillance camera mount includes a plate adapted to be disposed between the mounting surface and the bracket. The plate preferably has a tongue extending outwardly away from the mounting surface. With this construction, the flange on the base includes a slot adjacent the mounting surface adapted to receive the tongue on the plate.

Still additional details of the preferred embodiment include a pair of inwardly extending flanges on the bracket adapted to be disposed adjacent the mounting surface. The inwardly extending flanges, which comprise the bracket mounting means, can each include a tab extending away from the mounting surface in an alternative embodiment, and the slot in the flange on the base is then adapted to receive the tabs to assist in securing the base to the bracket. In this embodiment, the plate can be eliminated since the tabs function in the same manner as the tongue on the plate by cooperating with the slot in the flange on the base.

The bracket can include a switch to activate an alarm should tampering with the bracket occur.

Still other objects, advantages and features of the present invention will become apparent from a consideration of the following specification taken in conjunction with the accompanying drawings.

BRIEF DESCRIPTION OF THE DRAWINGS

FIG. 1 is an exploded perspective view of a surveillance camera mount in accordance with the present invention;

FIG. 2 is a perspective view illustrating the surveillance camera mount in a fully assembled condition;

FIG. 3 is a cross-sectional view taken on the line 3—3 of FIG. 1;

FIG. 4 is a partial external side elevational view of an alternative bracket embodiment for the surveillance camera mount of FIG. 1;

FIG. 5 is a partial top plan view of the bracket illustrated in FIG. 4;

FIG. 6 is a rear elevational view of the bracket illustrated in FIG. 4;

FIG. 7 is a partial front elevational view of the bracket illustrated in FIG. 4; and FIG. 8 is a partial internal side elevational view taken on the line 8—8 of FIG. 6.

DETAILED DESCRIPTION OF THE PREFERRED EMBODIMENTS

Referring to FIG. 1, a surveillance camera mount 10 in accordance with the present invention is illustrated. It includes a bracket 12 and a base 14 which, when secured together, form a substantially hollow housing generally designated 15. In addition, a plate 16 cooperates with the bracket 12 and the base 14 to define the substantially hollow housing 15 (see, also, FIG. 2).

Still referring to FIG. 1, the bracket 12 is adapted to be secured to a mounting surface such as a wall and has an upper surface 18 adapted to support a surveillance camera (not shown) and a pair of spaced, elongated side walls 20 and 22 depending therefrom to define what takes the form of an elongated opening or channel 24 disposed so as to face opposite the camera supporting surface 18, i.e., generally downwardly when mounted on a wall. The plate 16, as again will be appreciated by referring to FIGS. 1 and 2, is adapted to be disposed between the wall and the bracket 12 and comprises the remainder of the elongated hollow housing 15. As best shown in FIG. 1, the base 14 conforms to the elongated opening or channel 24 in the bracket 12 and has a flange generally designated 26 extending substantially about the perimeter thereof with at least a portion adapted to be disposed internally of the bracket 12.

In order to provide a secure mount, the flange 26 is in closely adjacent relation to the bracket 12 at least along the elongated side walls 20 and 22 when the base 14 is secured to the bracket 12. More particularly, it is advantageous for the spaced, elongated side flange portions 28 and 30 to be adapted for a sliding fit with the inside surface of the spaced, elongated side walls 20 and 22 to render it difficult, if not impossible, for insertion of a prying tool or the like therebetween. As a result, any unauthorized attempt to separate the base 14 from the bracket 12 is likely to be unsuccessful, and the surveillance camera mount is rendered secure in tamper-proof manner.

In the preferred embodiment, means are provided for mounting the bracket 12 to the wall in a tamper-proof manner, as well. The bracket 12 includes a pair of inwardly extending flanges 32 and 34 adapted to be disposed adjacent the wall. Both of the inwardly extending flanges 32 and 34 have a plurality of bolt-receiving holes 36 adapted for registration with a corresponding plurality of bolt-receiving holes 38 in the plate 16, and the inwardly extending flanges 32 and 34 can, thus, receive fasteners such as bolts (not shown) through the bolt-receiving holes 36. The bolts can also pass through the bolt-receiving holes 38 in the plate 16 so that the bracket 12 and the plate 16 can be securely bolted to the wall. With a bracket mounting means of the type described, complete unauthorized removal of the surveillance camera mount 10 is rendered essentially impossible.

In the preferred embodiment, means are also provided for locking the base 14 to the bracket 12 in a tamper-proof manner. It will be seen that the flange 26 on the base 14 includes a slot 40 in a rear flange portion 42 adapted to be disposed adjacent the wall for receiving a tongue 44 on the plate 16 extending outwardly away from the wall when the bracket 12 and the plate 16 have been bolted thereto, and the front flange portion 46 of the base 14 defines a front wall having a lip 48 remote from the mounting surfaces or wall which is adapted to be disposed in operative relation to retaining means in the form of a tongue 50 of the bracket 12. In addition, the base 14 is adapted to be secured to the bracket 12 by means of a tamper-proof fastener 52 or a lock 54, as will now be described.

Still referring to FIG. 1, the base 14 includes an integral centrally disposed and preferably hollow fastening block 56. The fastening block 56 has an upper surface 58 adapted to receive the tamper-proof fastener 52 which extends through a fastener receiving opening 60 in the upper surface 18 of the bracket 12. Alternatively, a lock-receiving opening 62 is provided in the upper surface 18 of the bracket 12. The lock 54 is adapted to be disposed in the lock-receiving opening 62 for cooperation with the fastening block 56 of the base 14 below the upper tamper-proof fastener receiving surface 58. By providing a slot 64 in the fastening block 56 (see FIG. 3), a radially extending finger 65 of the lock 54 can be pivoted into the slot 64 to lock the base 14 to the bracket 12.

Still referring to FIG. 1, the retaining means or tongue 50 on the bracket 12 is formed by cutting and bending the upper surface 18 of the bracket 12 and the tongue 50 faces away from the wall when the bracket 12 has been mounted on the wall by means of bolts or the like. The lip 48 on the front wall or flange portion 46 of the base 14 is adapted to be disposed over the tongue 50 and under the upper surface 18 of the bracket 12 on either side of the tongue 50 such that, by appropriately forming the tongue 50 with a bend as at 50a to have spring-like characteristics, the tongue 50 will cooperate to retain the lip 48 firmly in position between the tongue 50 and the portions of the upper surface 18 to either side thereof. By reason of the cooperation of the tongue 44 with the slot 40, the lip 48 with the tongue 50, and either the tamper-proof fastener 52 with the fastening block 56 or the lock 54 with the slot 64, the base 14 can be secured and/or locked in an effective and tamper-proof manner to the bracket 12.

As will be appreciated by referring to the bracket 14 as illustrated in detail in FIG. 1, the flange 26 is formed of the front wall or flange portion 46, the rear flange portion 42, and the side flange portions 28 and 30. It will be appreciated that, not only are the side flange portions 28 and 30 disposed in close sliding engagement with the inner surface of the side walls 20 and 22 of the bracket 12, but the front wall or flange portion 46 is interengaged by means of the lip 48 cooperating with the tongue 50 and under the upper surface 18 of the bracket 12 to either side thereof and the rear flange portion 42 is interengaged by means of the tongue 44 of the plate 16 cooperating with the slot 40. By also utilizing the tamper-proof fastener 52 or the lock 54, it is virtually impossible for the surveillance camera mount 10 to be destroyed or removed by would-be television camera thieves.

By comparing FIGS. 1 and 2, it will also be appreciated that the surveillance camera mount 10 is so constructed that the bolts or other fasteners utilized to extend through the holes 36 in the inwardly extending flanges 32 and 34 and the holes 38 in the plate 16 are entirely concealed when the base 14 is secured to the bracket 12 in the manner described in detail hereinabove. This will also be the case with respect to the television camera (not shown) which can be secured directly to the upper surface 18 of the bracket 12, prior to installation of the base 14, by means of fasteners accessible only internally of the bracket 12 which can extend through the holes 66 for this purpose. As also shown, the upper surface 18 can be provided with a larger hole 68 centrally disposed relative to the holes 66 to accommodate the cable that will extend from the television camera, and the cable (not shown) can then extend through the hollow housing 15 defined by the bracket 12 and the base 14, through a hole 70 in the plate 16, and into the wall where it can be run to a secure remote surveillance location so as to render the cable essentially totally concealed and protected from tampering.

While not described in any detail, it will be appreciated by those skilled in the art that the lock 54 can be conventional. It is preferably of the "drop in" type where it can be placed in the lock receiving opening 62 and can thereafter be secured by means of a nut 72 so as not to become separated from the bracket 12. By utilizing a key, the radially extending finger 65 is rotated about the axis of the lock 54 into and out of the slot 64 in the fastening block 56.

Referring now to FIGS. 4 through 8, an alternative embodiment in which the plate 16 is eliminated has been illustrated. It will there be seen that the bracket 12 again includes a pair of inwardly extending flanges 32 and 34 adapted to be disposed on the mounting surface or wall. The principal difference is that the inwardly extending flanges 32 and 34 each include a tab 32a and 34a, respectively, formed by bending a portion of the inwardly extending flanges 32 and 34 upwardly so as to extend away from the mounting surface or wall, substantially as shown. With this arrangement, the rear flange portion 42 of the bracket 14 can still utilize a single slot 40, as shown in FIG. 1, or can be provided with two smaller slots, positioned so as to receive the tabs 32a and 34a.

With the arrangement illustrated in FIGS. 4 through 8, the inwardly extending flanges 32 and 34 are directly bolted to the mounting surface or wall. The mounting surface or wall may thus have a hole to directly receive the cable of the television camera since the cable will pass between the inwardly extending flanges 32 and 34 upon exiting the hollow housing 15 defined by the bracket 12 and the base 14. Clearly, the embodiment illustrated in FIGS. 4 through 8 provides substantially the same tamperproof qualities of the previously described surveillance camera mount.

Finally, if desired, a microswitch 74 can be provided to give a visible or audible signal of tampering at a remote security station. The microswitch 74 can suitably be located in the fastening block 56 so as to project upwardly above the upper tamper-proof fastener receiving surface 58 where it normally will be depressed against the biasing force of a spring (not shown) by the underside of the upper surface 18 of the bracket 12 when the base 14 is secured to the bracket 12, although the microswitch 74 could also be provided at other positions relative to the bracket 12 and the base 14 to give an indication of tampering. As will be appreciated, any slight separation between the bracket 12 and the base 14 will result in the microswitch 74 activating the visible or audible signal.

While the foregoing embodiments have been set forth for purposes of illustration, it will be understood and appreciated that the invention is only to be limited by the claims appended hereto.

I claim:

1. A surveillance camera mount, comprising:
a bracket adapted to be permanently secured to a mounting surface, said bracket defining a portion of a hollow housing having a surface adapted to support a surveillance camera and an opening disposed to face opposite said camera supporting surface, and including means for permanently mounting said bracket to said mounting surface;
a base conforming to said opening in said bracket, said base defining the remainder of said hollow housing and having a flange extending substantially about the perimeter thereof with at least a portion adapted to be disposed internally of said bracket when said base is secured to said bracket, and including means for securing said base to said bracket;
said base securing means including first securing means operatively associated with said base and said bracket adjacent said mounting surface and second securing means operatively associated with said base and said bracket at a point remote from said mounting surface; and
means for locking said base to said bracket in a tamper-proof manner;
said first and second securing means and said bracket mounting means being concealed by said base when said base is locked to said bracket by said base locking means.

2. The surveillance camera mount as defined by claim 1 wherein said bracket also includes a pair of spaced, elongated side walls.

3. The surveillance camera mount as defined by claim 2 wherein said opening defined by said support surface and side walls is elongated, said elongated opening being disposed to face opposite said support surface.

4. The surveillance camera mount as defined by claim 3 including a plate adapted to be disposed between said mounting surface and said bracket, said plate having a tongue extending outwardly away from said mounting surface, said tongue comprising a portion of said first securing means operatively associated with said bracket.

5. The surveillance camera mount as defined by claim 4 wherein said flange on said base includes a slot adjacent said mounting surface adapted to receive said tongue on said plate, said slot comprising the remainder of said first securing means operatively associated with said base.

6. The surveillance camera mount as defined by claim 3 wherein said bracket includes a pair of inwardly extending flanges adapted to be disposed adjacent said mounting surface, said inwardly extending flanges comprising said bracket mounting means.

7. The surveillance camera mount as defined by claim 6 wherein said inwardly extending flanges each include a tab extending away from said mounting surface, said flange on said base having at least one slot adapted to receive said tabs, said tabs and said slots comprising said first securing means operatively associated with said bracket and said base.

8. The surveillance camera mount as defined by claim 3 wherein said bracket includes retaining means associated with said support surface remote from said mounting surface, said flange on said base defining a front wall having a lip adapted to be disposed in operative relation to said retaining means, said retaining means comprising said second securing means.

9. A surveillance camera mount, comprising:
a bracket adapted to be permanently secured to a mounting surface, said bracket defining a portion of an elongated hollow housing having an upper surface adapted to support a surveillance camera and a pair of spaced, elongated side walls depending therefrom to define an elongated opening disposed to face opposite said camera supporting surface, and including means for permanently mounting said bracket to said mounting surface;
a base conforming to said elongated opening in said bracket, said base defining another portion of said elongated hollow housing and having a flange extending substantially about the perimeter thereof with at least a portion adapted to be disposed internally of and in closely adjacent relation to said bracket at least along said elongated side walls when said base is secured to said bracket, and including means for securing said base to said bracket; and
a plate adapted to be disposed between said mounting surface and said bracket, said plate comprising the remainder of said elongated hollow housing, said plate having a tongue extending outwardly away from said mounting surface;

said flange on said base having a slot adjacent said mounting surface adapted to receive said tongue on said plate, said bracket having retaining means associated with said upper surface remote from said mounting surface, said flange on said base defining a front wall having a lip remote from said mounting surface adapted to be disposed in operative relation to said retaining means of said bracket, said tongue and said slot comprising a first portion of said base securing means and said retaining means comprising a second portion of said base securing means; and means for locking said base to said bracket in a tamper-proof manner;

said tongue and slot, said retaining means and said bracket mounting means being concealed by said base when said base is locked to said bracket by said base locking means.

10. The surveillance camera mount as defined by claim 9 wherein said bracket includes a pair of inwardly extending flanges adapted to be disposed adjacent said mounting surface, said inwardly extending flanges comprising said bracket mounting means.

11. The surveillance camera mount as defined by claim 10 wherein said inwardly extending flanges have a plurality of bolt receiving holes adapted for registration with a corresponding plurality of bolt receiving holes in said plate.

12. The surveillance camera mount as defined by claim 9 wherein said flange on said base includes a pair of spaced, elongated side flange portions joined by front and rear flange portions, said front flange portion defining said front wall having said lip adapted to be disposed in operative relation to said retaining means.

13. The surveillance camera mount as defined by claim 12 wherein said retaining means on said bracket includes a tongue formed by said upper surface to face away from said mounting surface, said lip on said front wall of said base being adapted to be disposed over said tongue and under said upper surface of said bracket on both sides of said tongue of said retaining means.

14. The surveillance camera mount as defined by claim 9 including a centrally disposed hollow fastening block integral with one of said base and said bracket, said fastening block having a surface adapted to receive a tamper-proof fastener extending through a fastener receiving opening in the other of said base and said bracket, said tamper-proof fastener and said fastening block comprising said base locking means.

15. The surveillance camera mount as defined by claim 9 including a lock receiving opening in one of said base and said bracket and a lock adapted to be disposed in said lock receiving opening, the other of said base and said bracket including means adapted to receive a radially extending finger of said lock for locking said base to said bracket, said lock and said finger receiving means comprising said base locking means.

16. A surveillance camera mount, comprising:

a bracket adapted to be permanently secured to a mounting surface, said bracket defining a portion of an elongated housing having an upper surface adapted to support a surveillance camera and a pair of spaced, elongated side walls depending therefrom to define an elongated opening disposed to face opposite said camera supporting surface, said bracket including a pair of inwardly extending flanges adapted to be disposed on said mounting surface for permanently mounting said bracket to said mounting surface;

a base conforming to said elongated opening in said bracket, said base defining the remainder of said elongated hollow housing and having a flange extending substantially about the perimeter thereof with at least a portion adapted to be disposed internally of said bracket with said flange in closely adjacent relation to said bracket at least along said elongated side walls when said base is secured to said bracket, and including means for securing said base to said bracket;

said flange on said base having at least one slot adjacent said inwardly extending flanges of said bracket, said inwardly extending flanges of said bracket each having a tab extending away from said mounting surface, said tabs on said flanges of said bracket being adapted to be disposed in said slot in said flange on said base;

said bracket also having retaining means associated with said upper surface remote from said mounting surface and said flange on said base defining a front wall having a lip remote from said mounting surface adapted to be disposed in operative relation to said retaining means of said bracket;

said tabs and said slot comprising a first portion of said base securing means and said retaining means comprising a second portion of said base securing means; and means for locking said base to said bracket in a tamper-proof manner;

said tongue and slot, said retaining means and said inwardly extending flanges being concealed by said base when said base is locked to said bracket by said base locking means.

17. The surveillance camera mount as defined by claim 16 wherein said flange on said base includes a pair of spaced, elongated side flange portions joined by front and rear flange portions, said front flange portion defining said front wall having said lip adapted to be disposed in operative relation to said retaining means.

18. The surveillance camera mount as defined by claim 17 wherein said retaining means on said bracket includes a tongue formed by said upper surface to face away from said mounting surface, said lip on said front wall of said base being adapted to be disposed over said tongue and under said upper surface of said bracket on both sides of said tongue of said retaining means.

19. The surveillance camera mount as defined by claim 16 including a centrally disposed hollow fastening block integral with one of said base and said bracket, said fastening block having a surface adapted to receive a tamper-proof fastener extending through a fastener receiving opening in the other of said base and said bracket, said tamper-proof fastener and said fastening block comprising said base locking means.

20. The surveillance camera mount as defined in claim 19 including a lock receiving opening in the other of said base and said bracket and a lock adapted to be disposed in said lock receiving opening, said fastening block having a slot adapted to receive a radially extending finger of said lock for locking said base to said bracket, said lock and said fastening block comprising said base locking means.

21. The surveillance camera mount as defined by claim 16 including microswitch means for activating a signal of tampering at a remote location, said microswitch means activating said signal in response to any separation of said base from said bracket.

* * * * *